United States Patent [19]

Hudson et al.

[11] Patent Number: 4,751,855
[45] Date of Patent: Jun. 21, 1988

[54] COMPOUND GEAR ARRANGEMENTS

[75] Inventors: Philip Hudson; Anthony J. Bentley, both of Wolverhampton, England

[73] Assignee: Lucas Industries Public Limited Company, Birmingham, England

[21] Appl. No.: 776,499

[22] Filed: Sep. 16, 1985

[30] Foreign Application Priority Data

Sep. 14, 1984 [GB] United Kingdom ............... 8423329

[51] Int. Cl.[4] .................. F16H 1/28; F16H 57/04
[52] U.S. Cl. .................................. 74/801; 74/467
[58] Field of Search ............... 74/768, 785, 797, 801, 74/411, 410, 805, 467; 403/380, 354; 184/6.12; 464/149, 157

[56] References Cited

U.S. PATENT DOCUMENTS

| | | | |
|---|---|---|---|
| 3,008,355 | 11/1961 | Grudin | 74/768 |
| 3,234,821 | 2/1966 | Himmel et al. | 74/768 X |
| 3,380,555 | 4/1968 | Myers et al. | 184/6.12 |
| 3,485,062 | 12/1969 | Blake | 464/149 X |
| 3,486,394 | 12/1969 | Heidrich | 74/410 |
| 3,640,150 | 2/1972 | Leiner et al. | 74/768 |
| 3,924,419 | 12/1975 | Barth | 464/149 X |
| 3,958,465 | 5/1976 | Hiersig et al. | 74/801 |
| 4,100,821 | 7/1978 | Geiger | 184/6.12 |
| 4,312,193 | 1/1982 | Gibbs et al. | 464/149 X |
| 4,391,163 | 7/1983 | Benthake et al. | 74/797 X |
| 4,399,719 | 8/1983 | Chszaniecki et al. | 74/410 |
| 4,480,492 | 11/1984 | Fujioka et al. | 74/467 |
| 4,513,637 | 4/1985 | Hirt | 74/801 |
| 4,583,413 | 4/1986 | Lack | 74/410 |
| 4,590,820 | 5/1986 | Hambric | 74/467 X |

FOREIGN PATENT DOCUMENTS 1439707  6/1976  United Kingdom ............... 403/380

*Primary Examiner*—Leslie A. Braun
*Assistant Examiner*—David Novais
*Attorney, Agent, or Firm*—Holman & Stern

[57] ABSTRACT

An epicyclic gear arrangement includes a plurality of substantially axially aligned epicyclic gear trains each having two relatively rotatable output ring gears, a sun input gear and planet gears drivingly connecting the sun and ring gears. Adjacent ends of the ring gears are spaced to permit axial misalignment, the teeth of the planet gears have reducing cross sections in directions away from the planes of their median cross sections to permit effective driving engagement with the ring gears in the event of axial misalignment of the latter, and the sun gears of the gear trains are drivingly interconnected in a manner that permits their axial misalignment. The arrangement is intended for a drive between parts which may flex, as for example an aircraft wing and a control surface thereon.

11 Claims, 4 Drawing Sheets

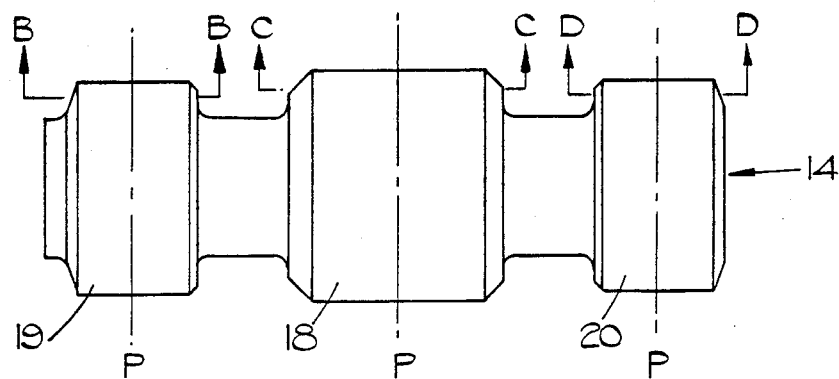
FIG. 3A
      
FIG. 3B    FIG. 3C    FIG. 3D

COMPOUND GEAR ARRANGEMENTS

BACKGROUND OF THE INVENTION

1. Field of the Invention

This invention relates to compound gear arrangements, and in particular to such an arrangement when intended for use as a geared hinge for an aircraft.

2. Description of the Prior Art

It is known, for example, from U.S. Pat. No. 3,008,355, to provide a geared hinge device which comprises an epicyclic gear train by means of which rotation of an axial input shaft causes rotation between adjacent annular members. As shown in the aforesaid patent it is also common practice to provide a plurality of identical axially aligned epicyclic gear trains each of which is driven by the same axial input drive shaft. This arrangement is intended to ensure that shearing of a drive element in one of the gear trains nevertheless allows the hinge to continue operating with the remaining one or more intact trains.

It is a disadvantage of such known arrangements that since gear trains which comprise the arrangement as a whole may have substantial length, when the arrangement is used, for example, as a geared hinge for a lift control surface on an aircraft wing, flexing of the wing, or the lift control surface, may result in stresses or misalignment of the gear train components.

BRIEF SUMMARY OF THE INVENTION

It is an object of the invention to provide a multi-train epicyclic gear arrangement in which this latter problem is overcome.

According to the invention there is provided an epicyclic gear arrangement comprising a plurality of substantially axially aligned gear trains each having two relatively rotatable ouput ring gears surrounding a sun gear input element and two planet gear elements, said planet gear elements being coupled for rotation in unison by said sun gear element and meshing with respective ones of said ring gears, the sun gear elements of adjacent gear trains being drivingly coupled by means for permitting axial misalignment between said sun gear elements, and adjacent edges of said ring gears being axially spaced.

BRIEF DESCRIPTION OF THE DRAWINGS

An embodiment of the invention will now be described by way of example only with reference to the accompanying drawings wherein:

FIG. 3A is an enlarged schematic elevational view of the planetary gear units in the gear assembly of FIG. 1;

FIGS. 3B, 3C and 3D are cross-sectional views taken through lines B, C, D, respectively, in FIG. 3A.

DETAILED DESCRIPTION

Figure 1:
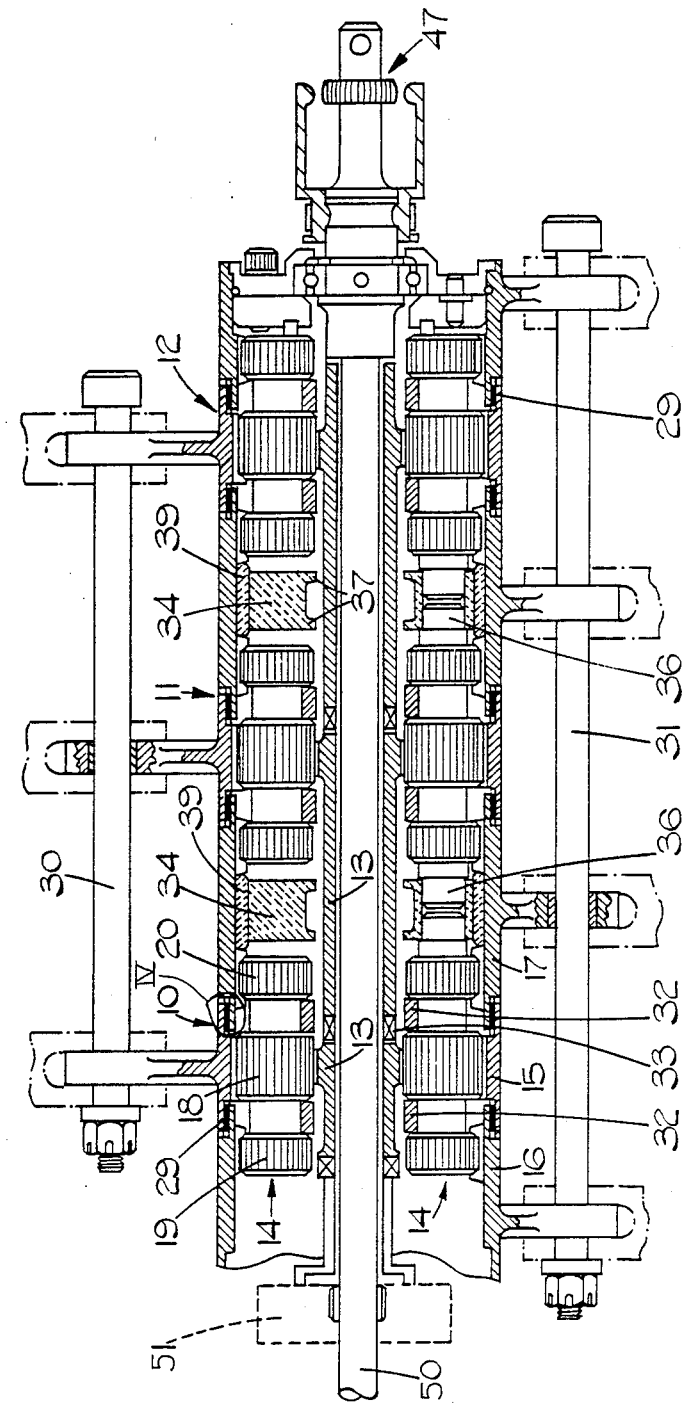
FIG. 1 is a longitudinal cross-sectional view through an epicyclic gear arrangement in accordance with the invention.

As shown in FIG. 1 three epicyclic gear trains 10, 11, 12 are axially aligned. For simplicity of description only the gear train 10 will be described in detail. This train has an input element in the form of a sun gear 13, a plurality planetary elements 14, a first output element in the form of a ring gear 15 and two second output elements in the form of ring gears 16, 17. In the construction shown, the ring gear 17 is integral with an adjacent ring gear of the gear train 11.

Each planetary elements 14 comprises a first pinion 18, which meshes with the sun gear 13 and two further identical pinions 19, 20 drivingly connected to the pinion 18 and axially spaced on opposite sides thereof. The pinion 18 meshes with the ring gear 15 and the pinions 19, 20 mesh with the ring gears 16, 17 respectively. The pinion 18 has a greater number of teeth than the pinions 19, 20 and the arrangement is such that rotation of the sun gear 13 results in relative rotation between the ring gear 15 and the ring gears 16, 17.

The ring gear 15 is coupled by a drive pin 30 to the corresponding ring gear in the drain 11. The ring gear 16 is coupled by a drive pin 31 to the ring gear 17 and to the corresponding ring gears of the trains 11 and 12. It is arranged that there may be slight angular play between the axes of the pins 30, 31 and the axes of the ring gears which they interconnect. Ring supports 32 engage cylindrical portions of the planetary elements 14 between the pinions 18, 19, 20, and maintain the latter in engagement with the respective ring gears 15, 16, 17.

The sun gear 13 and the corresponding sun gears in the remainder of the assembly are drivingly interconnected through drive dogs 33 which permit limited misalignment between the axes of these gears. The teeth of the pinions 18, 19, 20 of the planetary elements 14 have curved surfaces, that is the teeth are relieved as shown in FIG. 3, the sections 3B-3D being taken on tangents to the pitch circles of the pinions. This relieving comprises arcuate reduction of the thickness of each tooth in both directions extending away from the plane of a median cross-section of the pinion, these planes being indicated as P in FIG. 3A. The relieving reductions are preferably defined by arcs centered on the planes P.

Figure 4:
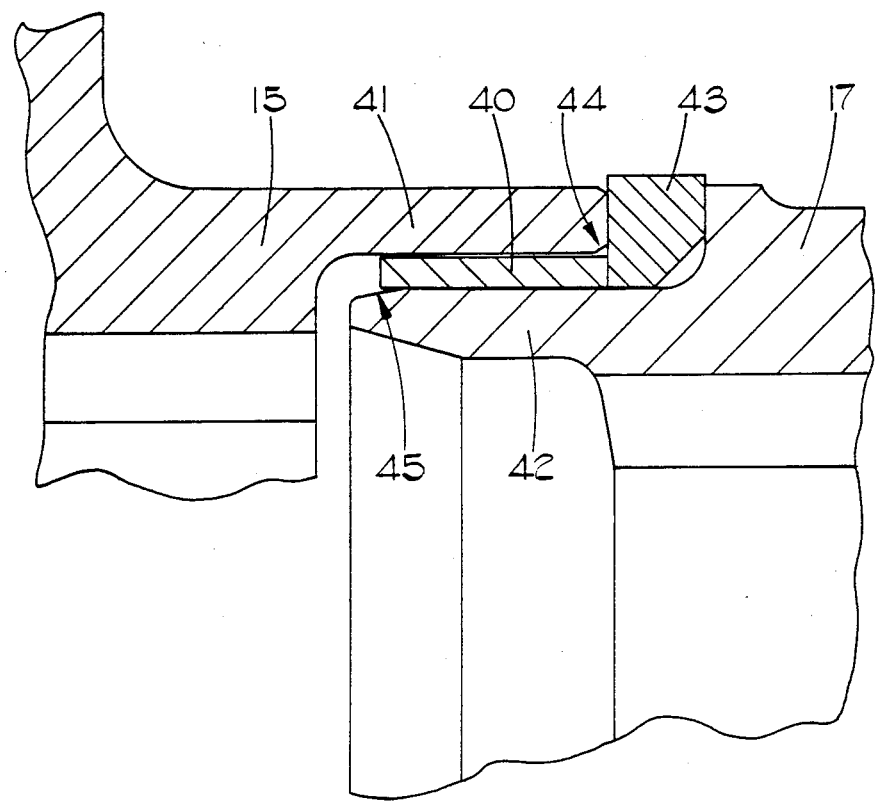
FIG. 4 is an enlarged fragmented cross-sectional view of the parts of circle IV of FIG. 1.

The interfaces between the ring gears 15, 16 and 15, 17 are, as shown, rebated to provide overlapping projections 41, 42 which have radial and axial clearances. FIG. 4 shows one such overlap, between the ring gears 15, 17, to an enlarged scale.

An antifriction alloy bush 40 preferably of phosphor bronze is interposed between cylindrical surfaces of the aforesaid projections 41, 42, and a phosphor bronze thrust bearing 43 is abutted by an end face of the projection 41 and by an opposed face of the gear 17, or gear 16. The inner surface of the projection 41 is chamfered at its edge as shown at 44, and the outer edge of the projection 42 is also chamfered as shown at 45. Since the gears 15, 16, 17 have, as shown in FIG. 1, small axial lengths relative to their diameters they may readily tilt relative to one another in conformity with flexing of a structure to which they are secured. The aforesaid chamfers are provided so as not to impede this tilting. The ring gears 15, 16, 17 may thus readily follow any flexing of an aircraft wing or control surface.

The crowned gear teeth of the planetary elements 14 permit these elements to continue in efficient driving engagement with gears 15, 16, 17 even when the latter are relatively tilted and have thereby displaced the axes of the elements 14. Resulting lateral or angular displacement between the axes of the sun gears 13 is accommodated by the drive dogs 33, which also permit relative axial movement between the gears 13.

In use, the pin 31 secures the ring gears 16, 17 to a relatively fixed part of an aircraft wing, and the pin 30 secures the ring gear 15 to a movable lift control surface. The permitted limited axial misalignments described above prevent flexing of the wing or the control surfaces from resulting in damage or jamming of the elements of the apparatus.

Figure 2:
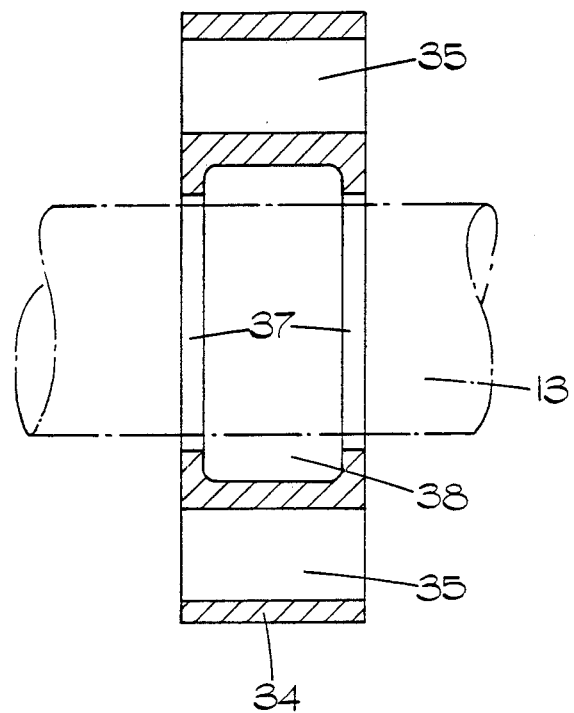
FIG. 2 is an enlarged cross-sectional view through a separator forming part of FIG. 1.

PTFE separator rings 34 are interposed between the gear trains, 10 and 11, and between the gear trains 11 and 12, and act to prevent any debris which is caused by damage to a gear train from entering an adjacent train. The separator rings 34 are rotatably mounted within the ring gears 17 by means of sleeves 39 and extend radially inwardly to locations adjacent the sun gears of the trains 11 and 12. A separator 34 is shown in more detail in FIG. 2, and is provided with a plurality of angularly-spaced bores 35 in which extensions 36 (FIG. 1) of at least some of the planetary elements 14 are located. Radially inner edges of each separator 34 are provided with lips 37 whose spacing from the sun gears 13 defines annular passages which do not impede flow of lubricant between the gear trains 10, 11, 12 but prevent significantly-sized particles of debris from passing between the trains. The lips 37 define, in combination with an adjacent cylindrical surface of the sun gear 13, an annular cavity 38 in which particles may be trapped. The lips 37 are sufficiently flexible and soft as to be either displaced or cut by debris from a broken gear which may be urged towards one side of the separator. Entry of such debris into the cavity 38 will cause it to be retained therein and not to pass on to an adjacent, undamaged one of the gear trains 10, 11 or 12. Typically the lips 37 have a radial dimension of 2.5 mm, and the cavities 38 have an axial extent of 8 mm. The PTFE material of the separators 34 provides a low coefficient of friction with the extensions 36 of the planetary elements 14. Additionally the separators 34 are freely rotatable in sleeves 39 within the ring gears 17.

Input drive to the arrangement as a whole is by means of a shaft 50 which is drivingly coupled to the leftmost sun gear 13 through an epicyclic gearbox 51, the ends of the shaft 50 being provided with toothed gear couplings, one of which is indicated at 47.

The gear couplings 47 are barrelled as shown, that is the crest of each tooth is arcuate about an axis which passes through the axis of rotation of the gear 47 and is at right angles to the axis of rotation.

I claim:

1. An epicyclic gear arrangement comprising:
 a plurality of substantially axially aligned gear trains;
 each gear train comprising,
  a sun gear input element,
  two relatively rotatable output ring gears surrounding said sun gear input element, and
  a compound planetary gear element comprising two pinions coupled for rotation in unison, one of said pinions being in driving mesh with said sun gear input element, said pinions meshing with respective ones of said two output ring gears; and
 substantially annular separator means disposed between adjacent gear trains for preventing passage of significantly-sized particles between said gear trains, each separator means comprising a resilient element mounted entirely within an output ring gear and extending radially inwardly with respect thereto to a position in adjacent spaced relation to the outer peripheral surface of said sun gear input element thereby defining in conjunction with said outer peripheral surface of said sun gear input element an annular, obstruction-free zone providing a passage for lubricant between adjacent gear trains, and substantially closing a zone between adjacent compound planetary gear elements so that said separator means does not support said sun gear input element.

2. An epicyclic gear arrangement as claimed in claim 1 wherein:
 said resilient element comprises a resilient ring mounted on an output ring gear.

3. An epicyclic gear arrangement as claimed in claim 2 wherein:
 said resilient ring has radially inner edges comprising lips defining an annular cavity surrounding a cylindrical surface of said sun gear input element.

4. An epicyclic gear arrangement as claimed in claim 2 wherein:
 each resilient ring has a plurality of angularly spaced bores in which planetary gear elements are rotatably disposed.

5. An epicyclic gear arrangement as claimed in claim 1 and further comprising:
 coupling means for drivingly connecting said gear trains for permitting axial misalignment between said sun gear input elements.

6. An epicyclic gear arrangement as claimed in claim 5 wherein:
 adjacent ends of said ring gears are rebated to provide overlapping projections on said ends; and further comprising
 an antifriction bushing located between said projections.

7. An epicyclic gear arrangement as claimed in claim 6 wherein:
 said projections have opposed faces and chamfered edges on said opposed faces.

8. An epicyclic gear arrangement as claimed in claim 5 wherein:
 said coupling means for permitting axial misalignment between said sun gear input elements comprises drive dogs on said sun gear elements.

9. An epicyclic gear arrangement as claimed in claim 5 wherein:
 teeth of at least one of said gear elements are relieved by having a reduced cross section in the directions extending oppositely from a median cross section thereof.

10. An epicyclic gear arrangement as claimed in claim 9 wherein:
 said cross-sectional reductions are in the thickness of the teeth.

11. An epicyclic gear arrangement as claimed in claim 10 wherein:
 said at least one of said gear elements comprises said planetary gear elements.

* * * * *